US012547714B2

(12) United States Patent
Vainstein et al.

(10) Patent No.: US 12,547,714 B2
(45) Date of Patent: Feb. 10, 2026

(54) LEVERAGING PUBLISHER PROFILE AND REPUTATION TO MITIGATE MALICIOUS ACTIVITY

(71) Applicant: MICROSOFT TECHNOLOGY LICENSING, LLC, Redmond, WA (US)

(72) Inventors: Maxim Vainstein, Redmond, WA (US); Andrew Michael Friedrich, Sammamish, WA (US); Danut Antoche-Albisor, Sammamish, WA (US); Kevin Robert Tremblay, Snohomish, WA (US); Yulia Pakman, Issaquah, WA (US); Daniel Alan Pagan, Redmond, WA (US); Ruizhi Sun, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 118 days.

(21) Appl. No.: 18/531,242

(22) Filed: Dec. 6, 2023

(65) Prior Publication Data

US 2025/0190560 A1    Jun. 12, 2025

(51) Int. Cl.
*G06F 21/56*    (2013.01)
*G06F 21/57*    (2013.01)

(52) U.S. Cl.
CPC .......... *G06F 21/564* (2013.01); *G06F 21/563* (2013.01); *G06F 21/577* (2013.01)

(58) Field of Classification Search
CPC ..... G06F 21/564; G06F 21/563; G06F 21/577
See application file for complete search history.

(56) References Cited

U.S. PATENT DOCUMENTS

2018/0018459 A1* 1/2018 Zhang ................ G06F 21/566
2023/0394159 A1* 12/2023 Misra ................. G06F 21/577

* cited by examiner

*Primary Examiner* — Normin Abedin
(74) *Attorney, Agent, or Firm* — Newport IP, LLC; Jacob P. Rohwer

(57) ABSTRACT

The techniques disclosed herein enable systems to leverage publisher profile and reputation to detect malware and block malicious actors. This is accomplished by obtaining a description of a software application that is pending release from the publisher. The description defines the nominal functionality of the software application such as expected program behaviors and device driver accesses. The system then catalogues the actual functionality of the software application by analyzing the program code implementing the software application. Accordingly, the generative model can detect inconsistencies between the actual functionality and the nominal functionality. In response, the generative model can initiate an interaction with the publisher to resolve the inconsistency. The publisher can respond with a justification of the inconsistency which is evaluated by the generative model in accordance with a reputation score associated with the publisher. The generative model optionally approves or blocks the software application based on the reputation score.

20 Claims, 10 Drawing Sheets

LEVERAGING PUBLISHER PROFILE AND REPUTATION TO MITIGATE MALICIOUS ACTIVITY

BACKGROUND

From social media to online gaming, remote file sharing to personal finance, an increasing portion of daily life takes place within complex software applications. To facilitate this, many organizations operate first-party platforms that enable software publishers to release applications to a broad userbase. For instance, a given operating system platform can include a publishing platform (e.g., an app store) through which an end user can download various software applications such as games, file managers, email clients, and so forth. As such, an end user downloading a software application from a publishing platform may have a reasonable expectation that the software application is safe to use. That is, the end user expects software applications which are approved for release on the publishing platform will not contain malicious code that harms the user's devices and/or personal data.

Accordingly, an organization that operates the publishing platform can utilize various techniques, such as antivirus programs and manual review, to prevent and/or mitigate malicious activity. Such techniques can be effective for detecting malicious program code (i.e., software that is expressly developed for use as malware). However, many malicious actors may evade detection by utilizing legitimate operations for malicious intent. In a simple example, file encryption is, on its face, a legitimate action that a software application may perform. For instance, file encryption can be utilized to protect sensitive user information. As such, typical antivirus programs may determine that a software application with file encryption functionality is non-malicious. However, the same file encryption functionality can be utilized as ransomware to lock away a user's data and demand monetary payment.

In another example, code obfuscation is a technique in which source or machine code is intentionally made difficult for humans and/or computers to understand. Similar to obfuscation in natural language writing, obfuscated code can use needlessly convoluted expressions to conceal the purpose and logic of a piece of code. Oftentimes, obfuscated code can be legitimately utilized to improve security, reduce file size, and protect trade secrets. Conversely, obfuscated code can be utilized to hide malicious code from detection. In this way, many existing methods for countering malware lack the ability to derive the intent of a given software publisher and evaluate the functionality of software applications within a broader contextual framework.

It is with respect to these and other considerations that the disclosure made herein is presented.

SUMMARY

The techniques described herein enable software publishing platforms to utilize a publisher profile and reputation to mitigate malicious activity, such as from malware and malicious actors. This is accomplished by utilizing a generative model to initiate interactions with publishers and derive context for a software application. For instance, the publisher can disclose the intended purpose of the software application, functionalities to achieve this purpose, and other pertinent information to the generative model when submitting the software application. Given this context, the generative model can determine whether the observed functionality of the software application (e.g., submitted program code) is consistent with the intended purpose. Stated another way, the generative model can detect suspicious segments of program code based on the context provided by a publisher's stated intent.

In the context of the present disclosure, the generative model can be implemented as a conversational artificial intelligence (AI) application (e.g., a chatbot) utilizing a general-purpose artificial intelligence application such as a transformer-based large language model (LLM), and the like. Unlike other artificial intelligence models, such as recurrent neural networks and long short-term memory (LSTM) models, transformer-based large language models make use of a native self-attention mechanism to identify vague contexts from limited available data. In this way, the generative model can provide exceptional performance in natural language conversation and logical deduction within a context established by disparate pieces of information.

Generally described, the disclosed system receives, from a publisher, a set of program code implementing a software application. In addition, the system receives a natural language description defining the nominal functionality of the software application. That is, the description defines the stated intent of software application and requisite software functionality to achieve the stated intent. In a specific example, the description is submitted in conjunction with the program code to enable the system to begin reviewing the software application. Conversely, the program code can be submitted first wherein the generative model initiates a conversation with the publisher in response to receiving the program code. Accordingly, the generative model can retrieve the description through an interview style conversation with the publisher.

Subsequently, the program code can be processed by the system to catalogue the actual functionality of the software application. In various examples, this is accomplished by parsing the program code to derive logical operations, the use of various functions, the movement of data, and so forth. Accordingly, the generative model can compare the actual functionality of the software application against the nominal functionality specified in the description. Stated another way, the generative model can evaluate the actual functionality of the software application within the context of the description.

Consequently, the generative model can detect any portions of the program code that represent inconsistencies between the actual functionality and the nominal functionality. For instance, a publisher may submit a video game. However, upon reviewing the actual functionality of the program code implementing the video game, the generative model may determine that the video game is utilizing file encryption libraries and accessing user data. The generative model may determine that accessing and encrypting user files is inappropriate for a video game context and accordingly mark the use of file encryption libraries as inconsistent with the nominal functionality (e.g., suspicious).

In response to detecting the inconsistency, the generative model can initiate an interaction with the publisher to inform the publisher of the suspicious segment of program code and the inconsistency with the description the publisher previously provided. Accordingly, the publisher can respond with a justification of the inconsistency. In a specific example, the publisher responds by stating that "the file encryption libraries were used to extract log files from remote servers during internal pre-release testing and were included in the final submission by mistake."

The generative model can then proceed to evaluate the justification provided by the publisher in light of a publisher profile. In various examples, the publisher profile can be constructed from the publisher's history (e.g., domain of expertise, operational history), previously released software applications, associated corporate profile (e.g., websites, business records) and so forth. In some examples, the publisher profile can be quantified as a reputation score which is calculated as a function of the various components of the publisher profile. In this way, the reputation score can be considered a quantification of the trustworthiness of a given publisher.

For instance, a game studio with a publisher profile that includes a long operational history (e.g., decades) releasing well-known video games and an active online presence can be assigned a high reputation score indicating a trustworthy reputation. As such, the generative model can attribute additional credibility to justifications provided by a publisher with a high reputation score. In a specific example, the high reputation score can be defined by a threshold reputation score where a reputation score that is greater than or equal to the threshold reputation score is considered a high reputation score. Accordingly, the generative model can determine that the justification provided by a publisher with a high reputation score sufficiently rationalizes the inconsistency and provisionally approve the software application.

Conversely, a game studio with a publisher profile that includes little to no operational history, no previously released video games and no online presence can be assigned a low reputation score. While a high reputation score can indicate a trustworthy publisher, a low reputation score does not necessarily indicate a malicious publisher. A newly established independent game studio can have a low reputation score for example. Rather, a low reputation score merely indicates that the associated publisher may require additional scrutiny (e.g., by a security analyst, by the generative model). As such, a justification from a publisher with a low reputation score may result in provisionally blocking (e.g., rejecting) the software application. That is, a low reputation score can cause the generative model to determine that the justification insufficiently rationalizes the inconsistency. However, a legitimate publisher with a low reputation score can continue to work with the generative model to resolve inconsistencies. Alternatively, the generative model may determine that the publisher is in fact a malicious actor and accordingly refer the matter to a security analyst. For instance, a publisher with a history of attempting to release malicious code through deceptive descriptions can be labeled by the generative model as a malicious actor as opposed to a legitimate publisher.

In contrast to many existing approaches, the disclosed system can introduce a greater level of depth to detecting malware in software applications prior to and/or subsequently after release via the discussed generative model. As mentioned, while existing approaches such as antivirus programs and manual review can be effective for detecting purpose-built malware, they may overlook malicious code that utilizes ostensibly legitimate operations. By acquiring a description and publisher profile for a given software application, the generative model can establish a contextual framework with which to evaluate the functionality of the software application. In this way, the disclosed system can enhance security by enabling thorough evaluations of program code that are customized to the context of each software application.

In another example of a technical benefit of the present disclosure, the generative model also streamlines the software publishing process by providing publishers a productive avenue to resolve inconsistencies, e.g., prior to release. Where existing approaches may wholly reject software applications that contain suspicious segments of program code, the generative model can instead initiate an interaction with the publisher to request explanation and ultimately work with the publisher to resolve inconsistencies between the actual functionality of the software application and nominal, intended functionality.

In still another example of the technical benefit of the present disclosure, the generative model further streamlines the software publishing process by improving accessibility for publishers that are located throughout the world. For instance, a software publishing platform that is primarily based in a specific geographic location (e.g., the western United States) and time zone (e.g., Pacific Standard Time) detects a suspicious segment of program code in a software application from a publisher located in another geographic location (e.g., India) and time zone (e.g., India Standard Time). If the software publishing platform is utilizing conventional antivirus and manual review methods, the software application may be wholly rejected and blocked from release. If the publisher wishes to resolve issues with the software application, the publisher must attempt to contact a person who conducted the manual review, which is often challenging when working across time zones, leading to dramatically extended timelines, unacceptable delays, and a degraded user experience. In contrast, by utilizing a generative model to interact with publishers, the present system can be used at any hour of the day to answer questions, provide feedback and so forth. In this way, the publisher can quickly resolve any issues with a software application and quickly move to release.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques discussed herein enhance the functionality of software publishing platforms by leveraging publisher profiles and reputation scores to mitigate malicious activity, such as from malware and malicious actors. This is accomplished through a generative model that retrieves a description defining a nominal functionality of a software application from a publisher. The description accompanies program code implementing the software application which the publisher submits to the software publishing platform for review by the software publishing platform. As such, the description serves as a contextual framework within which the actual functionality of the software application is evaluated. Upon detecting an inconsistency between the actual functionality and the nominal functionality of a software application, the generative model can initiate an interaction with the publisher to explain and resolve the inconsistency. In this way, the disclosed techniques improve the security of software publishing platforms by enabling thorough malware detection. Moreover, the disclosed techniques streamline the software publishing process by providing a collaborative environment to solve issues and all-hours availability.

Various examples, scenarios, and aspects that enable leveraging of publisher profile and reputation to block malware and malicious actors are described below with respect to FIGS. 1-7.

Figure 1:
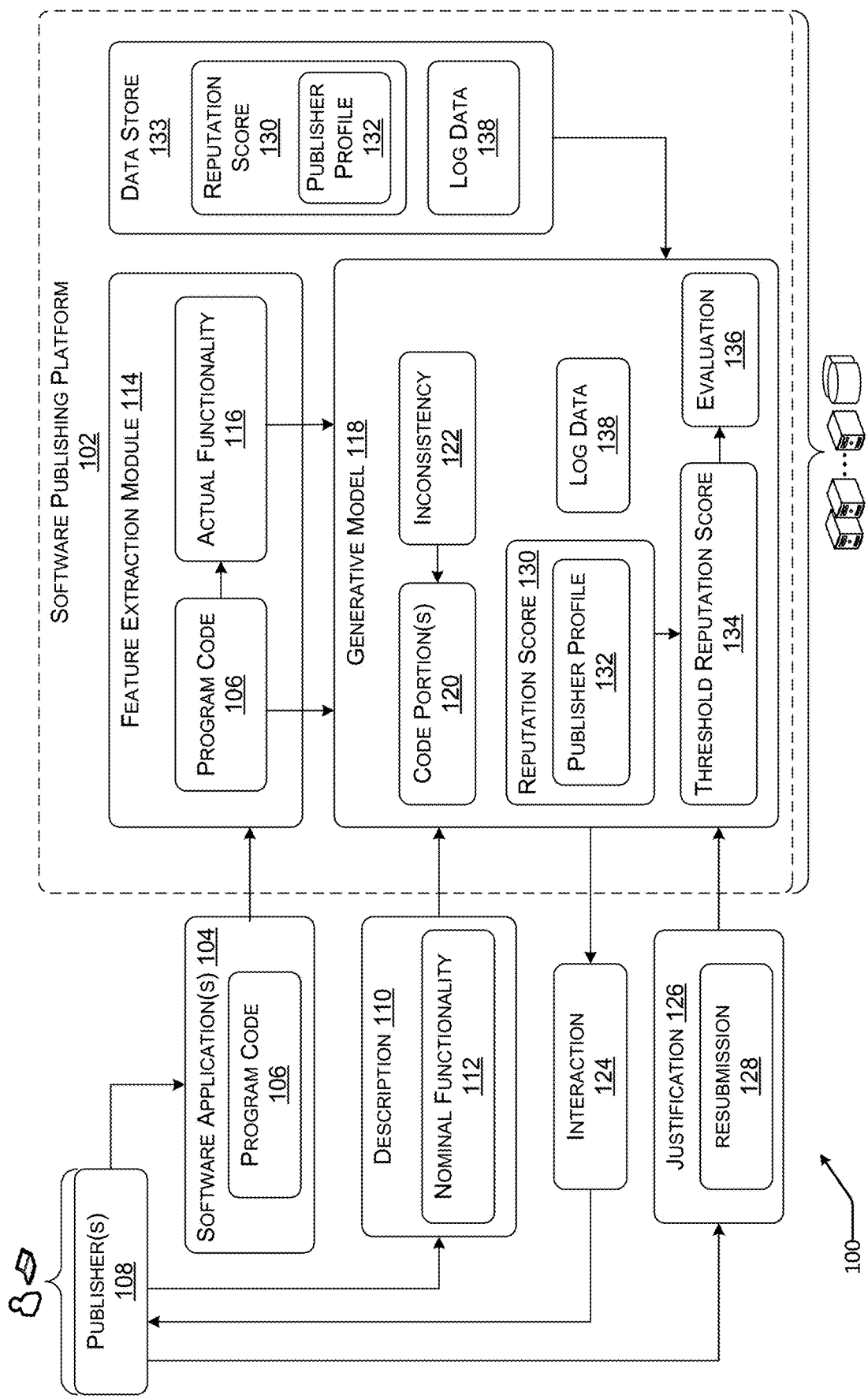
FIG. 1 is a block diagram of an environment in which a software publishing platform analyzes software applications to detect inconsistencies and interact with publishers to resolve issues.

FIG. 1 illustrates an environment 100 in which a software publishing platform 102 receives a software application 104 containing program code 106 from a publisher 108. In various examples, the software publishing platform 102 can be any online service operated by an associated entity for the digital distribution of software applications to end user devices such as smartphones, personal computers, tablets, and the like. As such, the publisher 108 can be another entity that is separate from, and external to, the software publishing platform 102 and can range from an individual developer to a large corporation.

Accordingly, any publisher 108 that wishes to release a software application 104 on the software publishing platform 102 must submit, for review, program code 106 implementing the software application 104. In addition to the program code 106, the publisher 108 may also submit a description 110 defining a nominal functionality 112 of the software application 104. That is, the description 110 defines an intended purpose of the software application 104 and technical operations implemented by the program code 106 to accomplish the intended purpose. In a specific example, the software application 104 is a photo editor. As such, the description 110 states that the nominal functionality 112 of the software application 104 is to allow a user to manipulate image data. To enable this functionality, the software application 104 will access user files to open and save a photo and occasionally transmit data over a network connection if the user decides to upload a photo (e.g., to cloud storage, to social media).

In various examples, the description 110 can be provided by the publisher 108 at the same time as the program code 106 as part of a complete initial submission. At the software publishing platform 102, the program code 106 implementing the software application 104 can be processed by a feature extraction module 114 to catalogue an actual functionality 116 of the software application 104. In a specific example, the actual functionality 116 is a list and/or description enumerating the various components that comprise the software application 104 such as individual files, application programming interface (API) usage, device hardware access, and so forth. As such, the feature extraction module 114 can be a software component that parses the program code 106 to uncover logical operations, the use of various functions, the movement of data, and the like. Accordingly, the feature extraction module 114 can provide the actual functionality 116 and/or the program code 106 to a generative model 118 for comparison against the nominal functionality 112 defined by the description 110.

In an alternative example, the publisher 108 can submit the program code 106 by itself. In response to receiving the program code 106, the software publishing platform 102 causes the generative model 118 to retrieve the description 110 from the publisher 108. In a specific example, the generative model 118 retrieves the description 110 through an interview-style conversation with the publisher 108 wherein the generative model 118 asks the publisher 108 a series of questions about the intended purpose of the software application 104 to derive the nominal functionality 112. While the description 110 can be primarily natural language text describing the nominal functionality 112, it should be understood that any suitable mode of input can be utilized instead of, or alongside, text such as images and audio. For example, the description can include an image illustrating the nominal functionality 112 and a video recording demonstrating the nominal functionality 112.

As shown in FIG. 1, the generative model 118 may detect a portion 120 of the program code 106 that represents an inconsistency 122 between the actual functionality 116 and the nominal functionality 112. That is, the detected code portion 120 implements an aspect of the actual functionality 116 that was not disclosed in the description 110 as part of the nominal functionality 112. For instance, returning to the example of a photo editor software application 104, the generative model 118 may detect a code portion that is directed to accessing an on-device microphone to record audio. On its face, recording audio over a microphone has a legitimate use and is not necessarily malicious. However, given the context established by the description 110, accessing an on-device microphone may not be expected for a photo editing software application 104 and can thus be considered suspicious and deserving of additional scrutiny.

In response to detecting the inconsistency 122, the generative model 118 can initiate an interaction 124 with the publisher 108. The interaction 124 can be a text chat informing the publisher 108 that an inconsistency 122 was discovered as well as providing any specific code portions 120 that represent the inconsistency 122. Moreover, the interaction 124 can request additional information such as an explanation of the inconsistency 122. While the interaction 124 can be expressed in text it should be understood that the interaction 124 can include any suitable input and/or output mode such as text, image, and audio. In a specific example, the interaction 124 is a continuation of the interview-style conversation that originally yielded the description 110.

In response to the generative model 118 initiating the interaction 124, the publisher 108 can provide a justification 126 of the inconsistency 122. Continuing with the example of the photo editor software application 104, the justification 126 can clarify that the code portion 120 directed to accessing an on-device microphone is part of an experimental voiceover feature that was not intended for release as part of the software application 104. Moreover, as part of the justification 126, the publisher 108 may include a resubmission 128 of some or all of the program code 106 to rectify the inconsistency 122. For example, the resubmission 128 can include an updated codebase with the code portion 120 representing the inconsistency 122 removed.

In an alternative example, the justification 126 states that the code portion 120 directed to accessing an on-device microphone enables a voiceover feature that the publisher 108 is releasing as an experiment to evaluate user interest in such a feature. In this way, the publisher 108 provides a rationalization of the inconsistency 122 that aligns with the context provided by the description 110. As such, the publisher can request that the code portion 120 be allowed to remain in the program code 106 despite the inconsistency 122.

In some examples, the generative model 118 proceeds to consider the justification 126 in light of a reputation score 130 associated with the publisher 108. As mentioned above, the reputation score 130 can be a numerical value quantifying the trustworthiness of the associated publisher 108. As such, the reputation score 130 can be calculated from a publisher profile 132 comprising information relating to the publisher 108 and compiled by the generative model 118. In a specific example, the publisher profile 132 includes information on the publisher's 108 area of expertise, previously released software applications, operational history, available publications such as news articles, research papers, websites, and so forth. In various examples, the reputation score and publisher profile 132 can be held within a data store 133 for access and utilization by the generative model 118.

In a specific example, the publisher profile 132 for the publisher 108 that developed the photo editing software application 104 shows that the publisher 108 has been in business for an extended period (e.g., decades) and has previously released multiple multimedia software applications 104 on the software publishing platform 102 which have not caused security incidents at user devices. Moreover, the publisher profile 132 shows that the publisher maintains an active online presence for promoting new features and engaging in customer service. Accordingly, the resultant reputation score 130 can be elevated in light of these positive aspects of the publisher profile 132 which indicate a trustworthy publisher.

The reputation score 130 is then compared against a threshold reputation score 134. In various examples, the threshold reputation score 134 can represent a minimum level of trustworthiness for a publisher that wishes to release a software application 104 on the software publishing platform 102. As such, a reputation score 130 that is greater than or equal to the threshold reputation score 134 can be considered a high reputation score. Conversely, a reputation score 130 that is less than the threshold reputation score 134 can be considered a low reputation score. Moreover, the threshold reputation score 134 can be customized to the context of an application type of the software application 104 as defined by the description 110. For example, a software application that intends to access protected user data, low level device privileges, and other sensitive information may require a publisher 108 to satisfy a higher threshold reputation score 134 than a software application that requires little to no sensitive information.

Accordingly, the generative model 118 can generate an evaluation 136 based on the comparison between the reputation score 130 and the threshold reputation score 134. In various examples, the evaluation 136 can define a course of action to take with respect to the software application 104 which can be automatically executed or optionally provided to an external entity for review. In an event where the reputation score 130 is greater than or equal to the threshold reputation score 134, the generative model 118 can determine that the justification 126 sufficiently rationalizes the inconsistency 122. Consequently, the evaluation 136 can approve the software application 104 for release on the software publishing platform 102. Alternatively, even if the reputation score 130 is not greater than or equal to the threshold reputation score 134, the generative model 118 may determine that the resubmission 128 is satisfactory for resolving the inconsistency 122 and the evaluation 136 likewise approve the software application 104 for release on the software publishing platform 102.

In another example, the generative model 118 can determine that the reputation score 130 is less than the threshold reputation score 134, indicating that the publisher 108 does not meet the minimum level of trustworthiness to publish a software application 104 without addressing potentially inconsistent features. Accordingly, the generative model 118 can determine that the justification 126 does not sufficiently rationalize the inconsistency 122. Consequently, the evaluation 136 can block the software application 104 from release on software publishing platform. In some examples, the software application 104 can be blocked from release even if the reputation score 130 is greater than or equal to the threshold reputation score 134. For instance, if the publisher 108 does not rectify the inconsistency 122 in their resubmission 128, the generative model 118 may generate an evaluation 136 that blocks the software application 104 from releasing on the software publishing platform 102.

In addition, the software publishing platform 102 can continue to monitor the behavior of software applications 104 following release utilizing the generative model 118. For instance, the generative model 118 can periodically retrieve log data 138 recording the operations of various software applications 104. Accordingly, the generative model 118 may detect an anomalous operation within the log data 138 representing functionality that is not included in the nominal functionality 112 defined by the description 110 (i.e., an inconsistency 122). For instance, this can occur following an update to the software application that introduces new functionality. In response to detecting the inconsistency 122, the generative model 118 can initiate a mitigation action against the offending software application 104 such as quarantining certain files, disabling access to computing resources, and so forth. Like the reputation score 130 and publisher profile 132 mentioned above, the log data 138 can be held in the data store 133 for subsequent access and utilization by the generative model 118.

Figure 2:
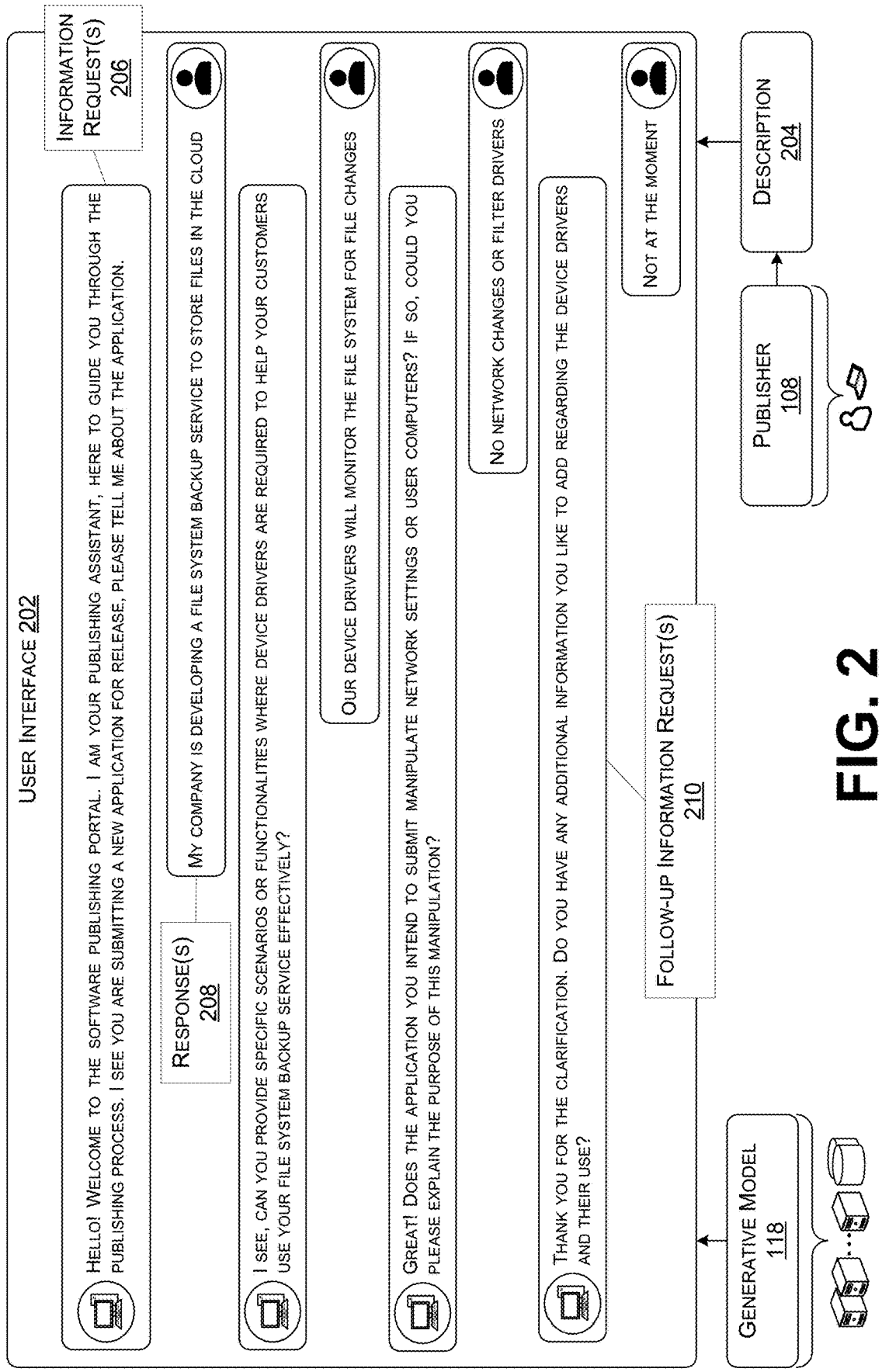
FIG. 2 illustrates a user interface for a publisher to interact with a generative model to provide a description defining a nominal functionality of a software application.

Turning now to FIG. 2, aspects of a user interface 202 in which a generative model 118 retrieves a description 204 from a publisher 108 are shown and described. As mentioned above, the generative model 118 can initiate an interview-style conversation with the publisher in response to receiving a submission containing program code implementing a software application. As shown, the generative model 118 can generate an information request 206 utilizing a conversational approach to become acquainted with the publisher 108 and provide a positive user experience. For instance, the information request 206 can enquire the publisher to "please tell me about the application."

Accordingly, the publisher 108 can provide a response 208 stating the intended purpose of the software application. For instance, the response can state that "my company is developing a file system backup service to store files in the cloud." Given the context of the response 208, the generative model 118 can generate a series of follow-up information requests 210 associated with the requisite technical operations for accomplishing the intended purpose of the software application. For instance, one follow-up information request 210 can ask for scenarios in which "device drivers are required to help your customers use your file system backup service effectively." In this way, the generative model 118 can gradually build a description 204 of the software application through a series of follow-up information requests 210 and responses 208.

Figure 3A:
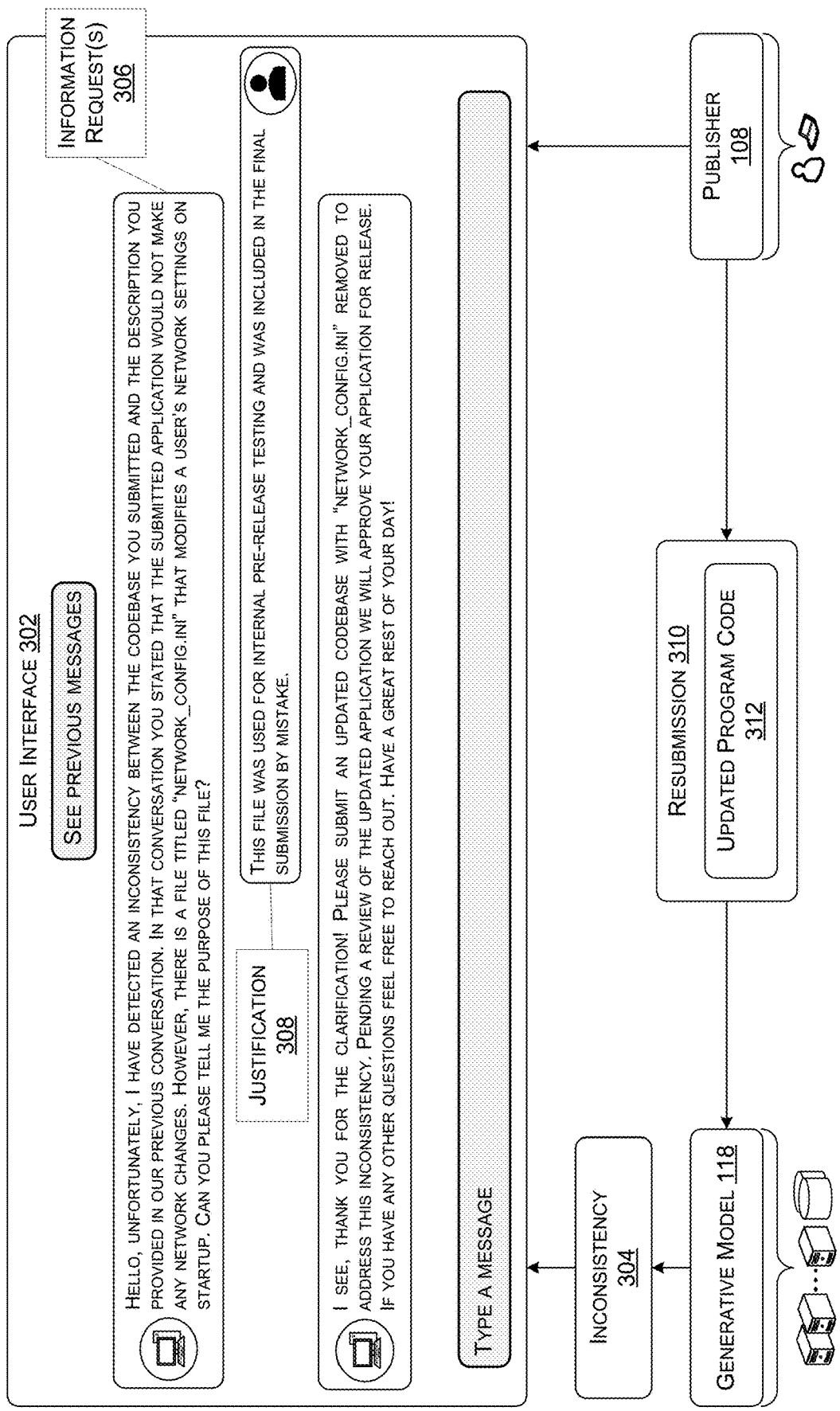
FIG. 3A illustrates a first example of a user interface for a publisher to interact with a generative model to resolve issues relating to inconsistencies between a nominal functionality and actual functionality of a software application.

Proceeding to FIG. 3A, aspects of a user interface 302 in which a generative model 118 initiates an interaction with a publisher 108 to discuss an inconsistency 304 in a submitted software application. As described above, the generative model 118 can receive a description defining the nominal functionality of the software application. In one example, the description is provided to the generative model along with program code implementing the software application. Alternatively, the description is constructed through an interview-style conversation between the generative model 118 and the publisher 108 such as in the example discussed with respect to FIG. 2. The generative model 118 can then compare the nominal functionality defined by the description against the actual functionality expressed by the program code.

Accordingly, the generative model 118 can detect an inconsistency 304 represented by a portion of the program that is directed to performing certain functionalities that were not disclosed in the nominal functionality of the description. In the example of FIG. 3, the generative model 118 generates an information request 306 to initiate an interaction with the publisher 108. As shown, the information request 306 can inform the publisher 108 that there is "an inconsistency between the codebase you submitted and the description you provided in our previous conversation." Moreover, the information request 306 can specify the nature of the inconsistency 304. For instance, the information request 306 can state that "in the previous conversation you stated that the submitted application would not make any network changes. However, there is a file titled "network_config.ini" that modifies a user's network settings on startup." Finally, the information request can request an explanation of the inconsistency 304.

In response, the publisher 108 submits a justification 308 providing a rationale for the inconsistency 304. For example, the justification 308 can state that "this file was used for internal pre-release testing and was included in the final submission by mistake." As discussed above, the generative model 118 can take the justification 308 into consideration in conjunction with a publisher profile and reputation score. Subsequently, the generative model 118 can reply with next steps for the publisher 108 to take to resolve the inconsistency 304. In the present example, the generative model 118 requests that the publisher 108 "submit an updated codebase with 'network_config.ini' removed." Accordingly, the publisher 108 provides a resubmission 310 comprising updated program code 312 to the generative model 118 for review.

Figure 3B:
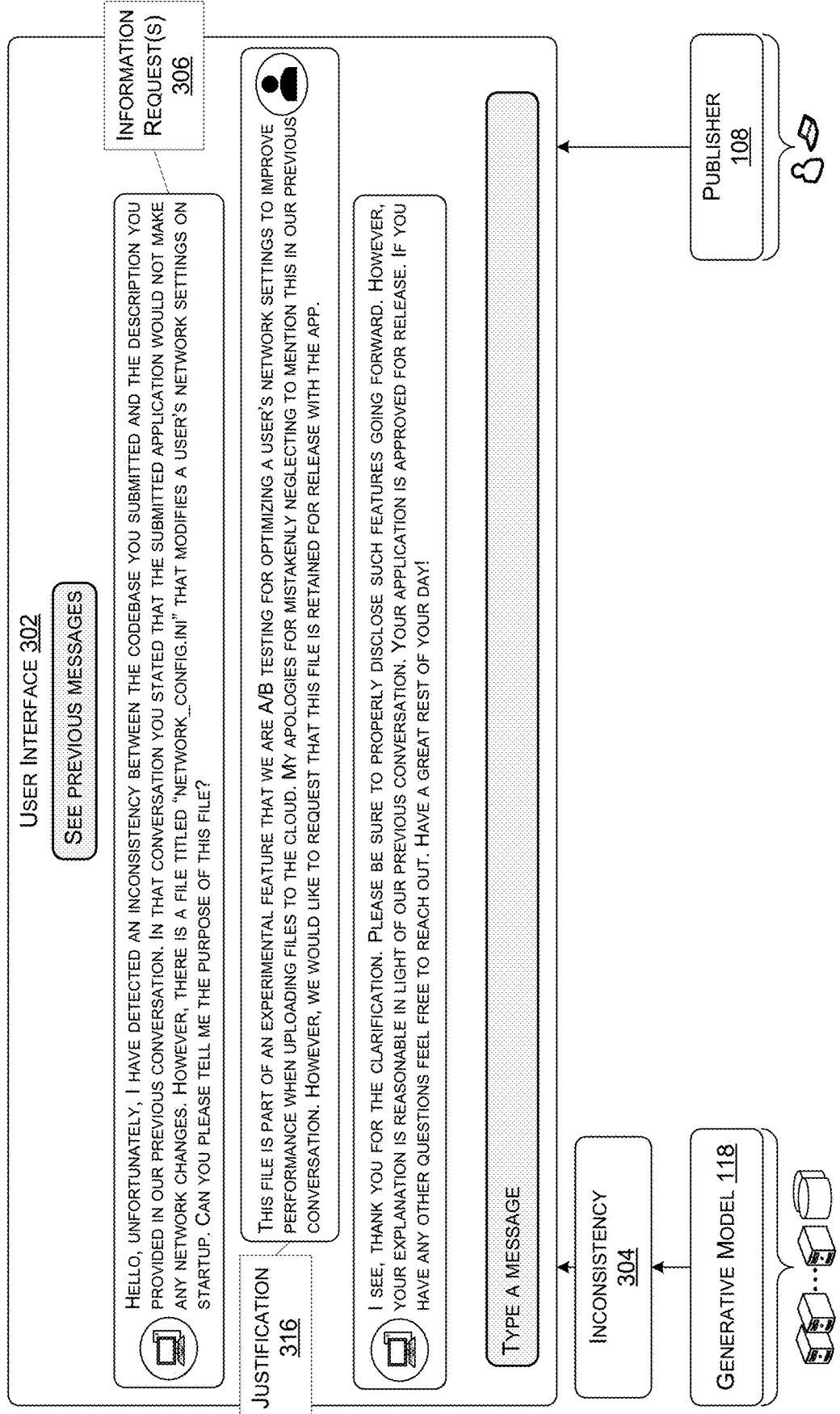
FIG. 3B illustrates a second example of a user interface for a publisher to interact with a generative model to resolve issues relating to inconsistencies between a nominal functionality and actual functionality of a software application.

Proceeding to FIG. 3B, an alternative example of the user interface 302 is shown and described. Like the example discussed above, with respect to FIG. 3A, the generative model 118 identifies an inconsistency 304 between the nominal functionality and actual functionality of a software application submitted by the publisher 108. Accordingly, the generative model 118 generates an information request 306 to initiate an interaction with the publisher 108 and resolve the inconsistency 304. In response, the publisher 108 provides a justification 316 of the inconsistency. As shown, the justification 316 states that the code portion 120 "is part of an experimental feature that we are A/B testing for optimizing a user's network settings to improve performance when uploading files to the cloud." Moreover, the publisher 108 requests that the code portion "is retained for release with the app."

The generative model 118 can subsequently evaluate the justification 316 within the context of the previously provided description as well as a profile and reputation score associated with the publisher 108. Based on this context, the generative model 118 can determine that the justification 316 "is reasonable in light of our previous conversation." Accordingly, the generative model 118 approves the application for release on the software publishing platform.

Figure 4A:
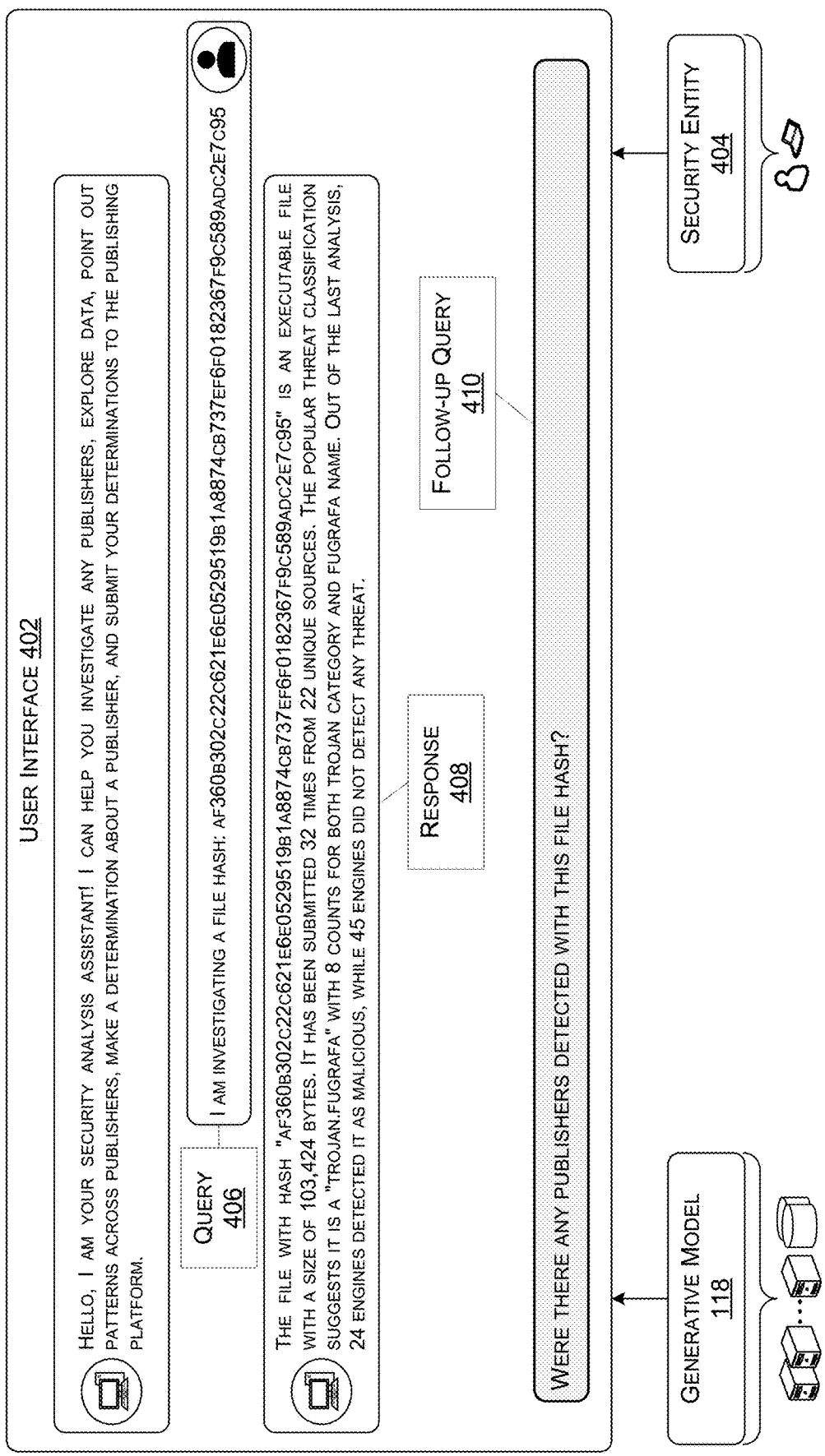
FIG. 4A illustrates a user interface for a security analyst to interact with a generative model to investigate a potentially malicious file.
Figure 4B:
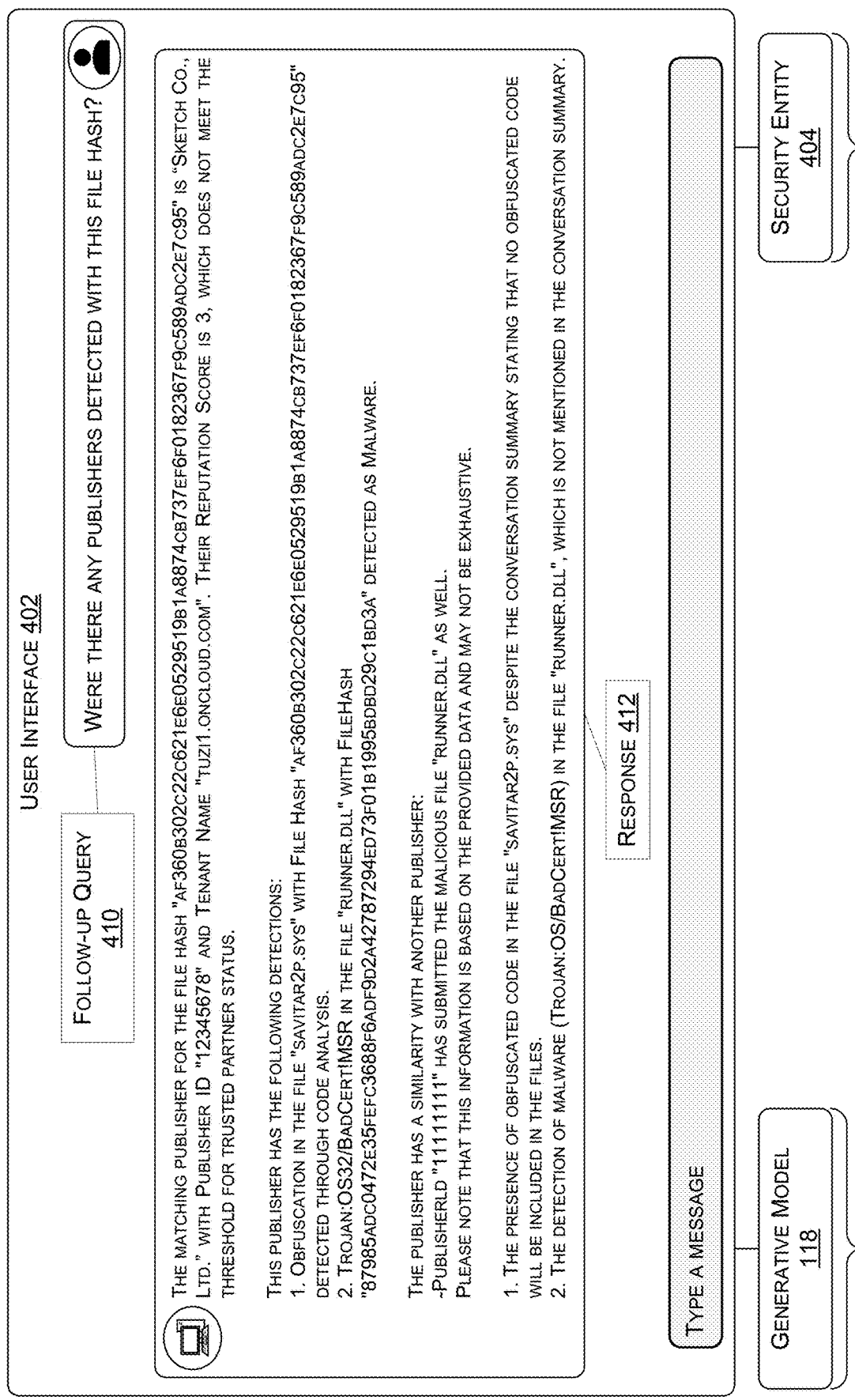
FIG. 4B illustrates a user interface for a security analyst to interact with a generative model to uncover publishers using a malicious file.

Turning now to FIG. 4A, aspects of a user interface 402 in which a generative model 118 assists a security entity 404 in an investigation of a suspicious file (e.g., a segment of program code). In various examples, the generative model 118 can initiate a conversation with a security entity 404 in response to detecting malicious program code. For instance, the generative model 118 may determine that a given software application most likely contains malicious code and thus is unsuitable for release on the software publishing platform. Rather than independently block the software application, the generative model can refer the matter to the security entity 404 by providing the detected malicious code, summaries of previous interactions, and other pieces of contextual information.

Alternatively, the security entity 404 may initiate the conversation with the generative model. For instance, the security entity 404 can provide a query 406 to the generative model 118 specifying a goal (e.g., "I am investigating a file") and an object associated with the goal ("file hash: af36 . . . "). In response, the generative model 118 can retrieve information pertaining to the specified object. In various examples, the generative model 118 can be configured with access to various data sources such as code repositories, a database associated with the software publishing platform, publicly available databases, and so forth. As such, the generative model 118 can generate a response 408 to the query 406 summarizing the nature of the file and (e.g., file size, file type, malicious, not malicious) and the file's presence in the software publishing platform (e.g., number of times submitted, number of unique sources).

The security entity 404 can then generate a follow-up query 410 with consideration for the information presented in the response 408. For instance, the follow-up query 410 can ask if there were "any publishers detected with this file hash." As shown, in FIG. 4B, the generative model 118 can generate a response identifying any publishers that have submitted the suspicious file. For instance, a publisher named "'Sketch Co. Ltd.' with Publisher ID '12345678' and Tenant Name 'tuzil.oncloud.com'." Moreover, the response 412 can include the reputation score associated with the publisher representing their publisher profile.

The generative model 118 can provide additional context surrounding the publisher (Sketch Co. Ltd.) such as previously detected inconsistencies and/or malicious code such as "obfuscation in the file 'savitar2p.sys'" and "Trojan: OS32/BadCert!MSR in the file 'runner.dll'". In this way, the generative model can establish that the publisher that submitted the file under investigation has previously attempted to release malicious code. Moreover, the generative model 118 can recall previous conversations with the publisher in which the publisher repeatedly violated the description they submitted by providing a summary of past interactions with the publisher. For example, the generative model 118 can observe that the file "savitar2p.sys" includes obfuscated code "despite the conversation summary stating that no obfuscated code will be included in the files." As such, the information compiled by the generative model 118 in the response 412 can assist the security analyst in forming a determination whether the file under investigation is malicious.

Figure 4C:
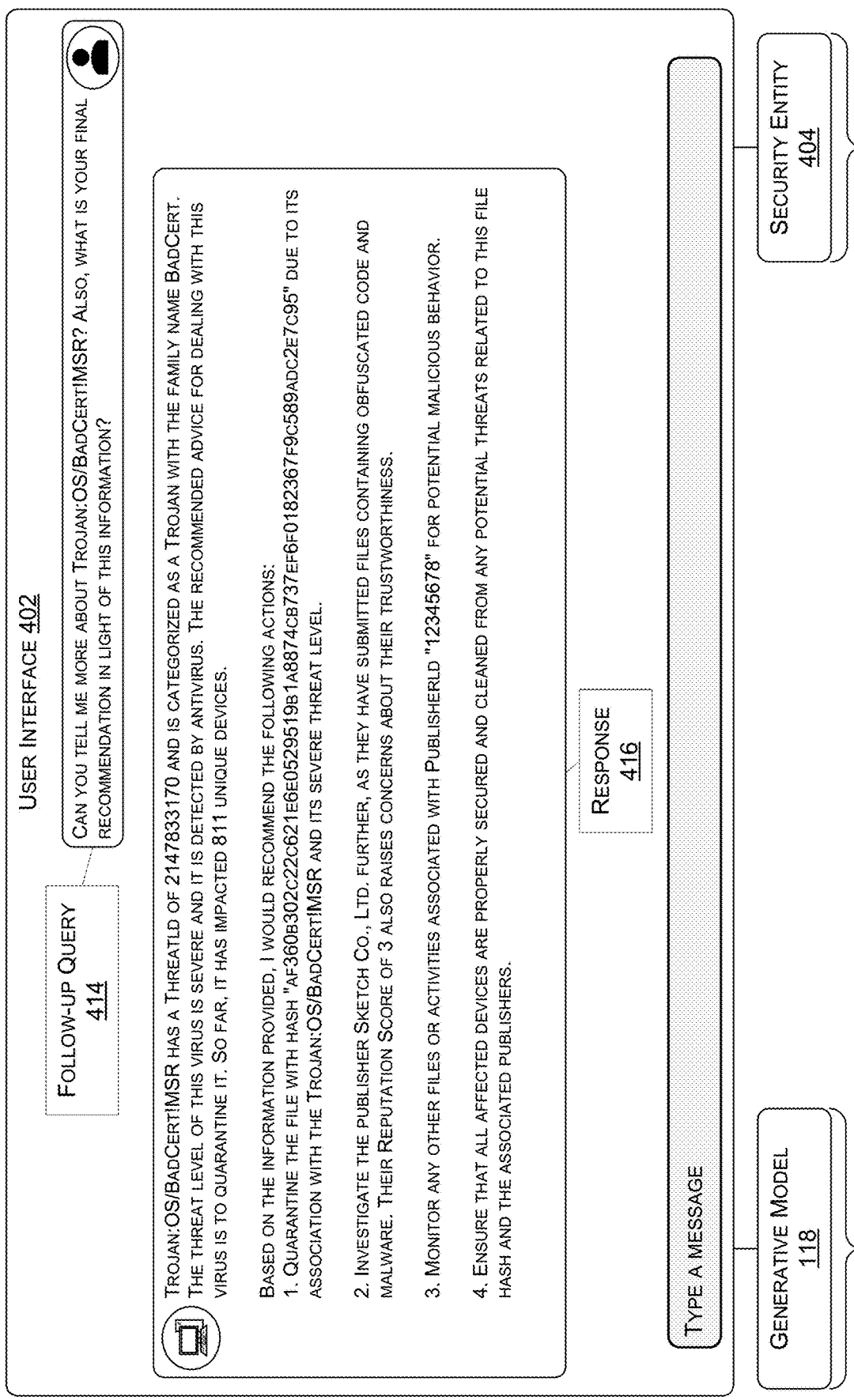
FIG. 4C illustrates a user interface for a security analyst to interact with a generative model to generate a recommended course of action with respect to publishers found using a malicious file.

Turning now to FIG. 4C, the security entity 404 can generate a follow-up query 414 requesting additional information on the malicious file associated with the publisher that submitted the file currently under investigation (Sketch Co. Ltd.). Furthermore, the follow-up query 414 can request a recommended course of action with respect to the publisher. In accordance with the follow-up query 414, the generative model 118 generates a response 416. As shown, response 416 can state that the malicious file represents a severe threat level and has already impacted 811 unique devices. As such, the generative model 118 can recommend quarantining the file currently under investigation "due to its association with the Trojan: OS/BadCert!MSR and its severe threat level." In addition, the generative model 118 can recommend further investigating and monitoring the publisher due to their past behavior and low reputation score indicating a questionable level of trustworthiness. Finally, the generative model 118 can recommend cleaning all affected devices of "any potential threats related to this file hash and the associated publishers." In this way, the generative model 118 can significantly streamline the work of countering malware and/or malicious actors.

Figure 5:
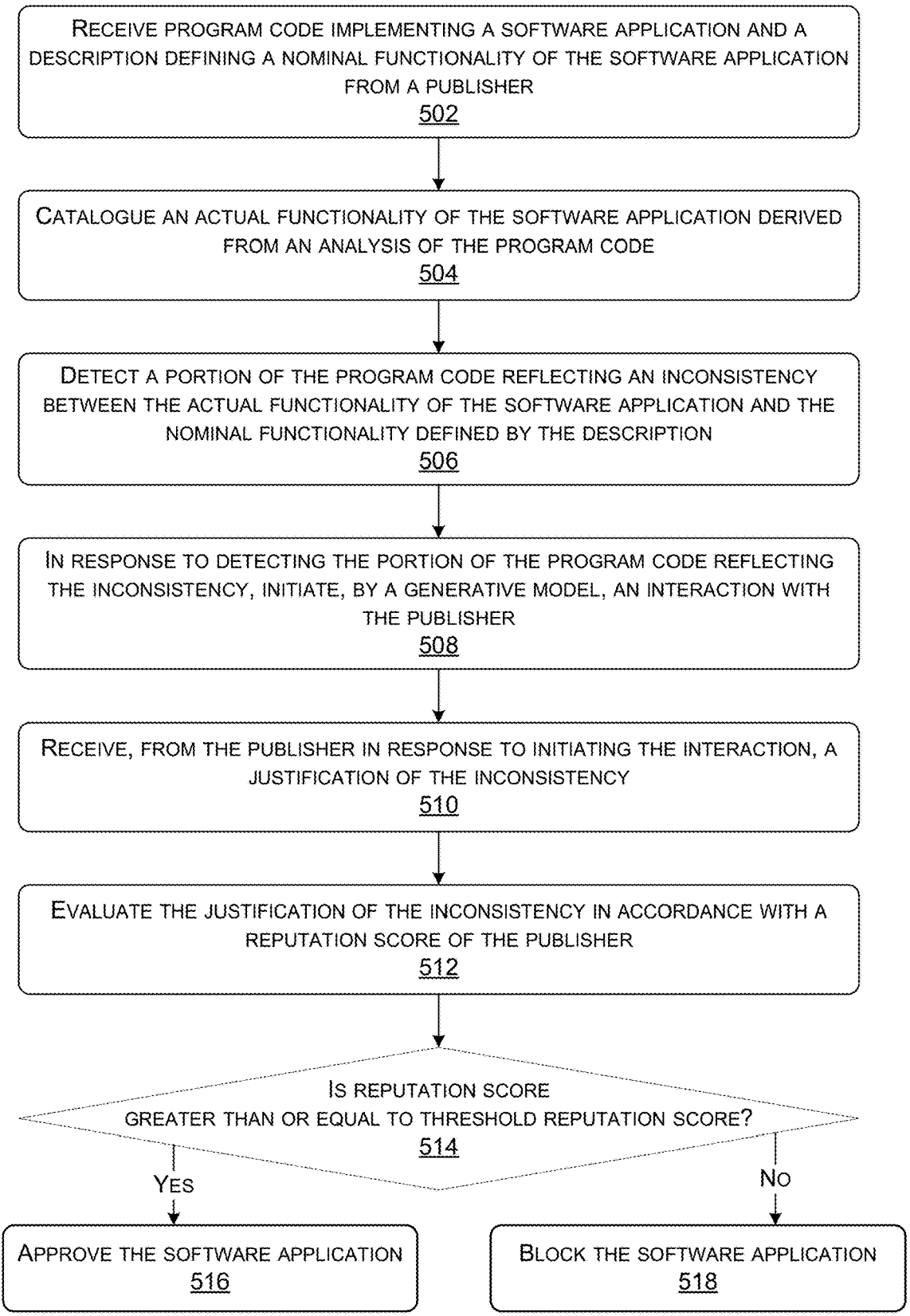
FIG. 5 is a flow diagram showing aspects of a process for detecting portions of program code representing inconsistencies between an actual functionality and a nominal functionality of a software application.

Turning now to FIG. 5, aspects of a process 500 for leveraging publisher profiles and reputation scores to block malware and malicious actors are shown and described. With respect to FIG. 5, the process 500 begins at operation 502 where a software publishing platform receives program code implementing a software application and a description defining a nominal functionality of the software application from a publisher. In one example, the description is submitted by the publisher simultaneously with the program code. Alternatively, the program code is submitted first and in response, a generative model initiates an interview-style conversation with the publisher to build a description through a series of information requests.

Next, at operation 504, the software publishing platform catalogues an actual functionality of the software application derived from an analysis of the program code. In a specific example, this analysis is performed by a feature extraction module that parses the program code to identify logical operations, the use of various functions, the movement of data, and so forth. The feature extraction module can be a component of the software publishing platform or optionally implemented as a separate entity.

Then, at operation 506, the software publishing platform detects a portion of the program code reflecting an inconsistency between the actual functionality of the software application and the nominal functionality defined by the description. In one example, the inconsistency is an organization of the program code that was not disclosed in the description such as code obfuscation. In another example, the inconsistency is a technical operation that was, as defined by the description, expressly absent from the program code such as modifying network settings.

Subsequently, at operation 508, in response to detecting the portion of the program code reflecting the inconsistency, the software publishing platform initiates, via a generative model, an interaction with the publisher. In various examples, the interaction can be carried out in a chat format in which the generative model informs the publisher of the inconsistency. The chat can utilize natural language text, however, the interaction can also include image, video, and/or other suitable content types.

Next, at operation 510, the software publishing platform receives, from the publisher in response to initiating the interaction, a justification of the inconsistency. In one example, the justification is an explanation for the presence of the inconsistency (e.g., "this file was used for internal pre-release testing and was included in the final submission by mistake").

Then, at operation 512, the generative model evaluates the justification of the inconsistency in accordance with a reputation score of the publisher. As described above, the reputation score can be a numerical value quantifying a level of trustworthiness of the publisher based on a publisher profile. In various examples, the publisher profile includes the publisher's history (e.g., domain of expertise, operational history), previously released software applications, associated corporate profile (e.g., websites, business records) and so forth.

Next, at operation 514, the generative model compares the reputation score against a threshold reputation score. In the event where the reputation score is greater than or equal to the threshold reputation score, the process 500 proceeds to operation 516 in which the generative model approves the software application. Conversely, in the event where the reputation score is less than the threshold reputation score, the process 500 proceeds to the operation 518 in which the generative model blocks (e.g., rejects) the software application.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the process 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the process 500 may also be implemented in other ways. In addition, one or more of the operations of the process 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
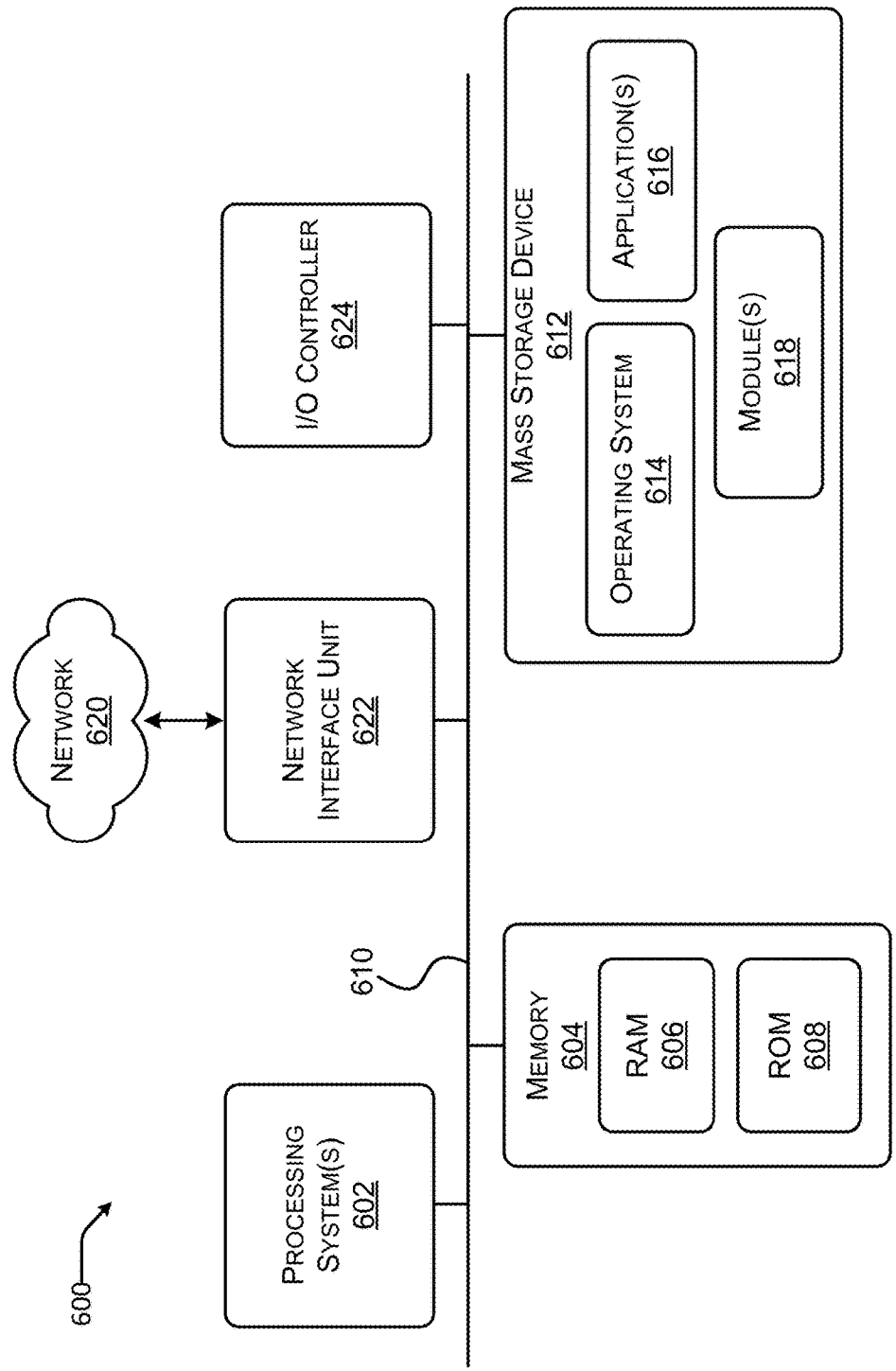
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location. Moreover, the systems discussed herein can be provided as a distributed computing system such as a cloud service.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

Figure 7:
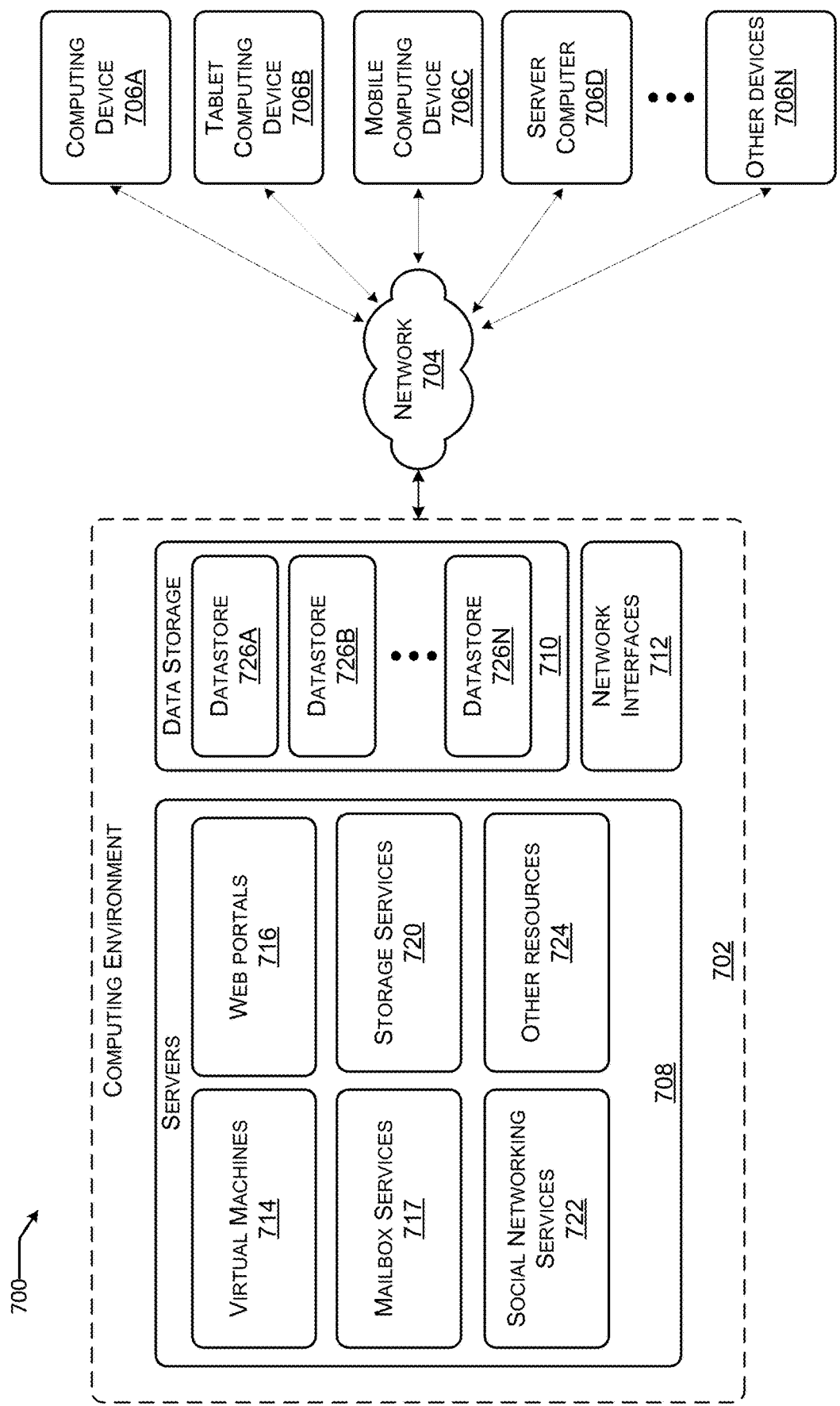
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722.

As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a system comprising: a processing system; and a computer readable medium having encoded thereon instructions that when executed by the processing system, cause the system to perform operations comprising: receiving program code implementing a software application and a description defining a nominal functionality of the software application from a publisher; cataloguing an actual functionality of the software application derived from an analysis of the program code; detecting a portion of the program code reflecting an inconsistency between the actual functionality of the software application and the nominal functionality defined by the description; in response to detecting the portion of the program code reflecting the inconsistency, initiating, by a generative model, an interaction with the publisher; receiving, from the publisher in response to initiating the interaction, a justification of the inconsistency; evaluating the justification of the inconsistency in accordance with a reputation score of the publisher wherein: the software application is approved in response to determining that the reputation score is greater than or equal to a threshold reputation score; and the software application is blocked in response to determining that the reputation score is less than the threshold reputation score.

Example Clause B, the system of Example Clause A, wherein the reputation score is calculated based on a historical record of the publisher and a previous software application released by the publisher.

Example Clause C, the system of Example Clause A or Example Clause B, wherein blocking the software application from release comprises a referral to a security entity, the referral comprising a summary of the interaction with the publisher and the inconsistency between the actual functionality and the nominal functionality of the software application.

Example Clause D, The system of Example Clause C, wherein the referral to the security entity further comprises a recommendation of an operation to perform with respect to at least one of the software application and the publisher.

Example Clause E, the system of any one of Example Clause A through D, wherein the operations further comprise: detecting, by the generative model following a release of the software application, an anomalous operation; determining that the anomalous operation is not included in the description defining the nominal functionality of the software application; and in response to the determining, initiating a mitigation action against the software application.

Example Clause F, The system of any one of Example Clause A through E, wherein the justification of the inconsistency includes a resubmission of the program code implementing the software application.

Example Clause G, the system of any one of Example Clause A through F, wherein the description defining the nominal functionality of the software application comprises at least one of a textual description of the nominal functionality, an image illustrating the nominal functionality, and a video recording demonstrating the nominal functionality.

Example Clause H, a method comprising: receiving program code implementing a software application and a description defining a nominal functionality of the software application from a publisher; cataloguing an actual functionality of the software application derived from an analysis of the program code; detecting a portion of the program code reflecting an inconsistency between the actual functionality of the software application and the nominal functionality defined by the description; in response to detecting the portion of the program code reflecting the inconsistency, initiating, by a generative model, an interaction with the publisher; receiving, from the publisher in response to initiating the interaction, a justification of the inconsistency; and evaluating the justification of the inconsistency in accordance with a reputation score of the publisher wherein the software application is approved in response to determining that the reputation score is greater than or equal to a threshold reputation score.

Example Clause I, the method of Example Clause H, wherein the reputation score is calculated based on a historical record of the publisher and a previous software application released by the publisher.

Example Clause J, the method of Example Clause H or Example Clause I, wherein blocking the software application from release comprises a referral to a security entity, the referral comprising a summary of the interaction with the publisher and the inconsistency between the actual functionality and the nominal functionality of the software application.

Example Clause K, the method of Example Clause J, wherein the referral to the security entity further comprises a recommendation of an operation to perform with respect to at least one of the software application and the publisher.

Example Clause L, the method of any one of Example Clause H through K, further comprising: detecting, by the generative model following a release of the software application, an anomalous operation; determining that the anomalous operation is not included in the description defining the nominal functionality of the software application; and in response to the determining, initiating a mitigation action against the software application.

Example Clause M, the method of any one of Example Clause H through L, wherein the justification of the inconsistency includes a resubmission of the program code implementing the software application.

Example Clause N, the method of any one of Example Clause H through M, wherein the description defining the nominal functionality of the software application comprises at least one of a textual description of the nominal functionality, an image illustrating the nominal functionality, and a video recording demonstrating the nominal functionality.

Example Clause O, a computer-readable storage medium having encoded thereon computer-readable instructions that when executed by a system cause the system to perform operations comprising: receiving program code implementing a software application and a description defining a nominal functionality of the software application from a publisher; cataloguing an actual functionality of the software application derived from an analysis of the program code; detecting a portion of the program code reflecting an inconsistency between the actual functionality of the software application and the nominal functionality defined by the description; in response to detecting the portion of the program code reflecting the inconsistency, initiating, by a generative model, an interaction with the publisher; receiving, from the publisher in response to initiating the interaction, a justification of the inconsistency; evaluating the justification of the inconsistency in accordance with a reputation score of the publisher wherein: the software application is approved in response to determining that the reputation score is greater than or equal to a threshold reputation score; and the software application is blocked in response to determining that the reputation score is less than the threshold reputation score.

Example Clause P, the computer-readable storage medium of Example Clause O, wherein the reputation score is calculated based on a historical record of the publisher and a previous software application released by the publisher.

Example Clause Q, the computer-readable storage medium of Example Clause O or Example Clause P, wherein blocking the software application from release comprises a referral to a security entity, the referral comprising a summary of the interaction with the publisher and the inconsistency between the actual functionality and the nominal functionality of the software application.

Example Clause R, the computer-readable storage medium of Example Clause Q, wherein the referral to the security entity further comprises a recommendation of an operation to perform with respect to at least one of the software application and the publisher.

Example Clause S, the computer-readable storage medium of any one of Example Clause O through R, wherein the operations further comprise: detecting, by the generative model following a release of the software application, an anomalous operation; determining that the anomalous operation is not included in the description defining the nominal functionality of the software application; and in response to the determining, initiating a mitigation action against the software application.

Example Clause T, the computer-readable storage medium of any one of Example Clause O through S, wherein the description defining the nominal functionality of the software application comprises at least one of a textual description of the nominal functionality, an image illustrating the nominal functionality, and a video recording demonstrating the nominal functionality.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different software applications).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system comprising:
   a processing system; and
   a computer readable medium having encoded thereon instructions that when executed by the processing system, cause the system to perform operations comprising:
      receiving program code implementing a software application and a natural language text description defining a nominal functionality of the software application from a publisher;
      cataloguing an actual functionality of the software application derived from an analysis of the program code;
      detecting a portion of the program code reflecting an inconsistency between the actual functionality of the software application and the nominal functionality defined by the natural language text description;
      in response to detecting the portion of the program code reflecting the inconsistency, initiating, by a generative model, an interaction with the publisher;
      receiving, from the publisher in response to initiating the interaction, a justification of the inconsistency;
      evaluating the justification of the inconsistency in accordance with a reputation score of the publisher, wherein:
         the software application is approved in response to determining that the reputation score is greater than or equal to a threshold reputation score; and
         the software application is blocked in response to determining that the reputation score is less than the threshold reputation score.

2. The system of claim 1, wherein the reputation score is calculated based on a historical record of the publisher and a previous software application released by the publisher.

3. The system of claim 1, wherein blocking the software application comprises a referral to a security entity, the referral comprising a summary of the interaction with the publisher and the inconsistency between the actual functionality and the nominal functionality of the software application.

4. The system of claim 3, wherein the referral to the security entity further comprises a recommendation of an operation to perform with respect to at least one of the software application and the publisher.

5. The system of claim 1, wherein the operations further comprise:
   detecting, by the generative model following a release of the software application, an anomalous operation;
   determining that the anomalous operation is not included in the natural language text description defining the nominal functionality of the software application; and
   in response to the determining, initiating a mitigation action against the software application.

6. The system of claim 1, wherein the justification of the inconsistency includes a resubmission of the program code implementing the software application.

7. The system of claim 1, wherein the natural language text description defining the nominal functionality of the software application is associated with an image illustrating the nominal functionality, or a video recording demonstrating the nominal functionality.

8. A method comprising:
   receiving program code implementing a software application and a natural language text description defining a nominal functionality of the software application from a publisher;
   cataloguing an actual functionality of the software application derived from an analysis of the program code;
   detecting a portion of the program code reflecting an inconsistency between the actual functionality of the software application and the nominal functionality defined by the natural language text description;
   in response to detecting the portion of the program code reflecting the inconsistency, initiating, by a generative model, an interaction with the publisher;
   receiving, from the publisher in response to initiating the interaction, a justification of the inconsistency; and
   evaluating the justification of the inconsistency in accordance with a reputation score of the publisher, wherein the software application is approved in response to determining that the reputation score is greater than or equal to a threshold reputation score.

9. The method of claim 8, wherein the reputation score is calculated based on a historical record of the publisher and a previous software application released by the publisher.

10. The method of claim 8, wherein blocking the software application comprises a referral to a security entity, the referral comprising a summary of the interaction with the publisher and the inconsistency between the actual functionality and the nominal functionality of the software application.

11. The method of claim 10, wherein the referral to the security entity further comprises a recommendation of an operation to perform with respect to at least one of the software application and the publisher.

12. The method of claim 8, further comprising:
    detecting, by the generative model following a release of the software application, an anomalous operation;
    determining that the anomalous operation is not included in the natural language text description defining the nominal functionality of the software application; and
    in response to the determining, initiating a mitigation action against the software application.

13. The method of claim 8, wherein the justification of the inconsistency includes a resubmission of the program code implementing the software application.

14. The method of claim 8, wherein the natural language text description defining the nominal functionality of the software application is associated with an image illustrating the nominal functionality or a video recording demonstrating the nominal functionality.

15. A computer-readable storage medium having encoded thereon computer-readable instructions that when executed by a system cause the system to perform operations comprising:
    receiving program code implementing a software application and a natural language text description defining a nominal functionality of the software application from a publisher;
    cataloguing an actual functionality of the software application derived from an analysis of the program code;
    detecting a portion of the program code reflecting an inconsistency between the actual functionality of the software application and the nominal functionality defined by the natural language text description;
    in response to detecting the portion of the program code reflecting the inconsistency, initiating, by a generative model, an interaction with the publisher;
    receiving, from the publisher in response to initiating the interaction, a justification of the inconsistency;
    evaluating the justification of the inconsistency in accordance with a reputation score of the publisher, wherein:
        the software application is approved in response to determining that the reputation score is greater than or equal to a threshold reputation score; and
        the software application is blocked in response to determining that the reputation score is less than the threshold reputation score.

16. The computer-readable storage medium of claim 15, wherein the reputation score is calculated based on a historical record of the publisher and a previous software application released by the publisher.

17. The computer-readable storage medium of claim 15, wherein blocking the software application comprises a referral to a security entity, the referral comprising a summary of the interaction with the publisher and the inconsistency between the actual functionality and the nominal functionality of the software application.

18. The computer-readable storage medium of claim 17, wherein the referral to the security entity further comprises a recommendation of an operation to perform with respect to at least one of the software application and the publisher.

19. The computer-readable storage medium of claim 15, wherein the operations further comprise:
    detecting, by the generative model following a release of the software application, an anomalous operation;
    determining that the anomalous operation is not included in the natural language text description defining the nominal functionality of the software application; and
    in response to the determining, initiating a mitigation action against the software application.

20. The system of claim 1, wherein the software application is approved for release on a platform that digitally distributes the software application to a plurality of end user devices.

* * * * *